United States Patent [19]
Tobioka

[11] 3,854,805
[45] Dec. 17, 1974

[54] EXPOSURE TIME CONTROL MECHANISM FOR MOTION PICTURE CAMERA

[75] Inventor: Takashi Tobioka, Omiya, Japan

[73] Assignee: Fuji Photo Optical Co., Ltd., Omiya-shi, Japan

[22] Filed: Sept. 13, 1973

[21] Appl. No.: 396,892

[30] Foreign Application Priority Data
Sept. 14, 1972 Japan.............................. 47-92505

[52] U.S. Cl.................... 352/121, 352/84, 352/169
[51] Int. Cl. ......................................... G03b 17/46
[58] Field of Search ............. 352/121, 169, 137, 84

[56] References Cited
UNITED STATES PATENTS
3,259,040  7/1966  Kumagai.......................... 352/84 X
3,705,764  12/1972  Reinsch ............................. 352/121

Primary Examiner—Monroe H. Hayes

[57] ABSTRACT

A rotary shutter blade is rotated by a shutter driving shaft. An exposure time control mechanism is interposed between the shutter blade and the shutter driving shaft. The exposure time control mechanism is capable of producing a long exposure by intermittently transmitting the rotation of the driving shaft to the shutter blade. The intermittent driving or transmission of rotation is effected by use of a coupling mechanism a part of which is fixed to the shutter blade and the other part of which is fixed to the driving shaft.

6 Claims, 13 Drawing Figures

3,854,805

3,854,805

EXPOSURE TIME CONTROL MECHANISM FOR MOTION PICTURE CAMERA

BACKGROUND OF THE INVENTION

1. Field of the Invention

This invention relates to an exposure time control mechanism for a motion picture camera, and more particularly to a prolonged time exposure mechanism or shutter mechanism adapted to be used in a motion picture camera employing a rotary shutter blade. The prolonged time exposure referred to in this specification means a slow shutter speed with a slow film feed speed and with a slow rotation of the rotary shutter blade.

2. Description of the Prior Art

In accordance with the usual techniques practiced heretofore, artificial illumination has been used in taking a motion picture indoors, or outdoors in the dark. Use of artificial illumination, however, is disadvantageous not only in that the handling thereof is troublesome but also in that the quality of the image is undesirably deteriorated by the artificial light. Therefore, it has been proposed that a better quality motion picture could be taken without using artificial illumination by increasing the film sensitivity, enlarging the f-number of the taking lens and prolonging the exposure time. In order to obtain good results in taking motion pictures without using artificial illumination, each of the above factors must be sufficiently considered. From the mechanical viewpoint, there is a possibility of increasing the exposure time by improving the shutter mechanism.

SUMMARY OF THE INVENTION

In view of the foregoing observations and description of the conventional techniques in motion picture cameras, it is an object of the present invention to provide an improved exposure time control mechanism for a motion picture camera by which the exposure time or shutter time is prolonged.

Another object of the present invention is to provide an exposure time control mechanism for a motion picture camera which is capable of prolonging the exposure time to more than twice the normal exposure time.

Still another object of the present invention is to provide a long time exposure mechanism for a motion picture camera which is of simple construction.

A further object of the present invention is to provide an exposure time control mechanism of simple construction for a motion picture camera which is also capable of changing the film feed speed.

In order to accomplish the above objects, the exposure time control mechanism in accordance with the present invention includes an intermittent transmission means between a rotary shutter blade and a driving shaft of a motion picture camera. The intermittent transmission means comprises a pin fixed to the rotary shutter blade and a pair of coupling projections fixed to the driving shaft to drive the shutter blade by engagement with said pin. By manual operation, the engagement of the projections with the pin can selectively be made continuous or intermittent to operate the shutter blade normally or effect the longer exposure. By intermittently driving the shutter blade so as to stop the sector in the aperture opening position, a long exposure time is obtained.

In one embodiment of the present invention, the axis of the driving shaft is made movable into and out of alignment with the axis of the rotary shutter blade by a manual operation. When both axes are aligned with each other, the rotation of the driving shaft is fully transmitted to the shutter blade. When the axis of the driving shaft is moved out of alignment with the axis of the rotary shutter blade, the rotation of the driving shaft is intermittently transmitted to the shutter blade and the shutter blade is periodically left in the aperture opening position while being intermittently driven by the driving shaft, whereby the exposure time is prolonged. While the shutter blade is stopped in the aperture opening position and the aperture is opened for exposure, the film feed mechanism is in the film stopping position to keep the film still during the exposure time.

In another embodiment of the present invention, the pin fixed to the shutter blade is made elastic in the shape of a leaf spring and a pin guide is movably provided between said projections on the driving shaft and the pin on the shutter blade to control the engagement of the projections with the pin. When the pin guide is not in an interfering position, the pin is continuously engaged with one of the projections and the rotation of the driving shaft is constantly transmitted to the shutter blade. When the pin guide is in the interfering position, the pin is guided by the pin guide to be intermittently brought into engagement with the projections and the rotation of the driving shaft is intermittently transmitted to the shutter blade resulting in long exposure time.

DESCRIPTION OF THE PREFERRED EMBODIMENTS

Figure 1:
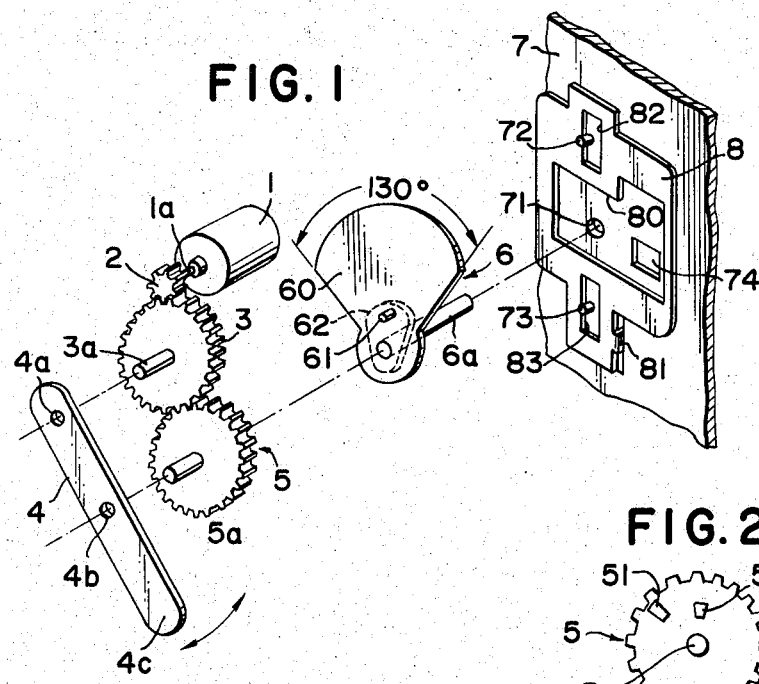
FIG. 1 is an exploded perspective view showing the exposure mechanism in accordance with an embodiment of the present invention.

Referring to FIG. 1 which shows an embodiment of the exposure mechanism in accordance with the present invention, a driving motor 1 has a driving shaft 1a carrying a first driving gear 2. The first driving gear 2 is meshed with an intermediate gear 3 having a shaft 3a which is stationarily provided in a motion picture camera in fixed relation with the first driving gear mounted on the driving shaft 1a of the motor 1. The shaft 3a of the intermediate gear 3 is held in a hole 4a of a swing lever 4 which is swingable about the hole 4a. The swing lever 4 is provided with another hole 4b at a position apart from said hole 4a in the middle of the lever. A second driving gear 5 is meshed with said intermediate gear 3 and rotatably supported in said second hole 4b of the swing lever 4 by the shaft 5a thereof. By manually swinging the end 4c of the swing lever 4, the position of the axis of the second driving gear 5 can be moved in a circular arc about said hole 4a and the shaft 3a of the intermediate gear 3.

Figure 2:
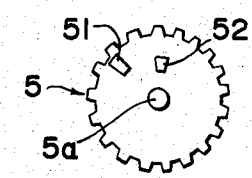
FIG. 2 is a front view showing a driving gear having projections for rotating a shutter blade employed in the first embodiment of the invention shown in FIG. 1.

The second driving gear 5 is provided with two projections, an outer projection 51 and an inner projection 52 on the side thereof faced to the shutter mechanism as shown in FIG. 2. The outer projection 57 is fixed to the side face of the driving gear 5 at a predetermined distance from the axis thereof. The inner projection 52 is also fixed to the side face of the driving gear 5 at a smaller distance from the axis than said predetermined distance and angularly spaced from said outer projection 51.

A shutter blade 6 having a sector portion 60 is rotatably provided on a shaft 6a which is stationarily located in the camera in rotatable engagement with a frame 7 of the camera. The shaft 6a of the shutter blade 6 is located on the circular locus of the shaft 5a of the driving gear 5 and in parallel to the shaft 5a. The rotary shutter blade 6 is provided with a pin 61 fixed to the side thereof faced to said driving gear 5 so that the pin 61 may be engaged with said projections 51 and 52 and rotation of the driving gear 5 may be transmitted to the shutter blade 6. On the other side of the shutter blade 6 is fixed a plate cam 62. The plate cam 62 is engaged with an opening 80 of a claw plate 8 which has a claw 81 at the lower end portion thereof and is vertically slidable substantially along the frame 7. The claw plate 8 is provided with vertically extending slots 82 and 83 at the upper portion and lower portion thereof, respectively. The slots 82 and 83 are slidably engaged with guide pins 72 and 73 respectively, fixed to the frame 7. The frame 7 is provided with a hole 71 to rotatably support said shaft 6a of the shutter blade 6. Beside the hole 71 an aperture 74 is provided to pass the light from the taking lens to the film. Said opening 80 of the claw plate 8 always covers the hole 71 and the aperture 74. As the shutter blade 6 rotates, the cam 62 moves the claw plate 8 up and down and accordingly moves the claw 81 up and down periodically. The claw 81 is put into engagement with perforations of a motion picture film to feed the film intermittently.

Figure 3:
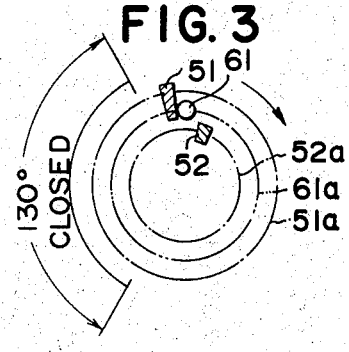
FIG. 3 is an explanatory front view with the driving gear removed showing the loci of the projections and a pin engaged with each other for transmission of the rotation between the driving gear and the shutter blade.

In normal operation of the above described motion picture camera, the swing lever 4 is in such a position that the shaft 5a of the driving gear 5 is in line with the shaft 6a of the shutter blade 6 and the pin 61 is always in engagement with the outer projection 51 as shown in FIG. 3. The rotation of the driving gear 5 is, accordingly, fully transmitted to the shutter blade 6 and the shutter blade 6 is continuously rotated. Therefore, the sector portion 60 of the shutter blade 6 closes the aperture 74 periodically once each revolution of the shutter blade and the driving gear 5. In the embodiment shown in FIG. 1 the angle of the sector portion 60 is 130°, and accordingly, the aperture 74 is closed while the pin 61 is in the angle of 130° indicated with a solid line 63 in FIG. 3. The locus 61a of the pin 61 is concentric with the loci 51a and 52a of the projections 51 and 52 as shown in FIG. 3. The operation of the shutter blade 6 or the closing and opening of the aperture 74 is graphically shown in FIG. 6. The solid line A indicates the operation of the shutter blade when the swing lever 4 is in the normal position for normal operation of the shutter. The broken line Ac indicates the behavior of the claw 81. As shown by the lines A and Ac, the claw 81 feeds the film twice and the shutter blade 6 is closed and opened twice while the driving gear 5 rotates twice.

Figure 4A:
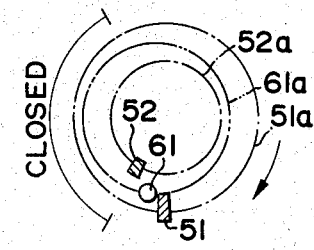
FIGS. 4A to 4C are explanatory front views with the driving gear removed showing the loci and behavior of the projections and the pin where the elements are in the long exposure time positions.
Figure 4B:
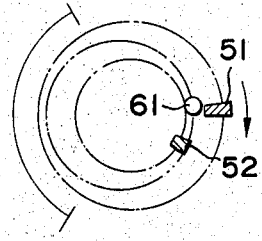
Figure 4C:
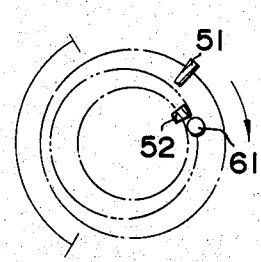
Figure 5:
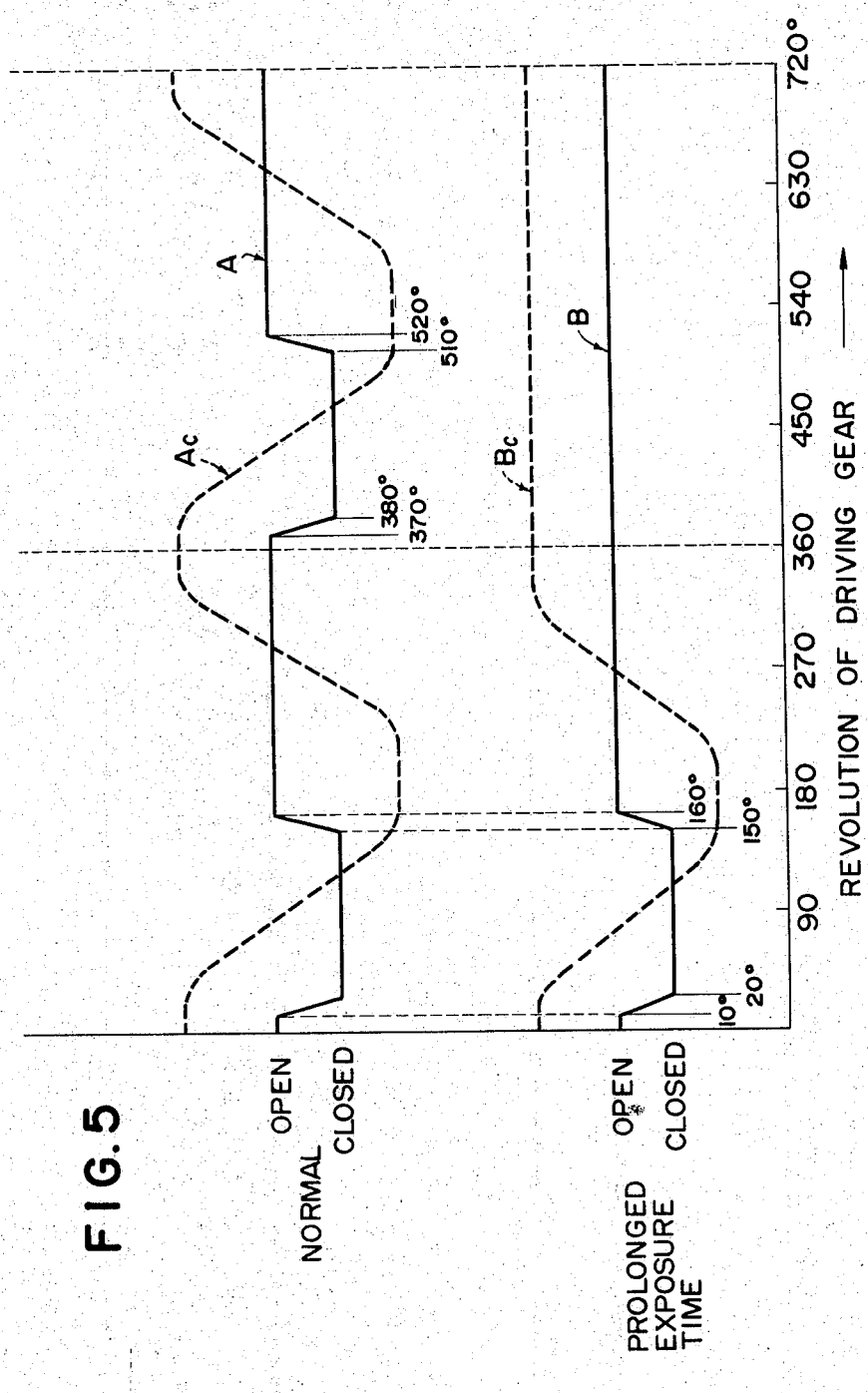
FIG. 5 is a graphical representation showing the operation of the shutter blade with respect to the rotation of the driving gear.

In prolonged time exposure operation, the lever 4 is swung slightly to move the driving shaft 5a out of alignment with the shaft of the shutter blade 6. Thus, the loci 51a and 52a of the projections 51 and 52 are made eccentric with the locus 61a of the pin 61 with the center of rotation of the pin 61 biased toward the closed-side as shown in FIGS. 4A to 4C. Since the locus 61a of the pin 61 is biased radially outwards toward the closed-side, the pin 61 is pushed and rotated by the outer pin 51 and passes the closed-side normally. (FIG. 4A) Then, when the outer projection 51 has carried the pin 61 beyond the closed-side, the pin 61 slips off the projection 51 as shown in FIG. 4B to leave the pin 61 in that position. Thereafter, the projections 51 and 52 rotate without carrying the pin 61 until the inner projection 52 comes to the position of the pin 61. When the inner projection 52 comes to the pin 61 as shown in FIG. 4C, the inner projection 52 starts to carry the pin 61. Then, the inner projection 52 carries the pin 61 up to a position where the pin 61 slips off the projection 52 as shown in FIG. 4A. On slipping off the inner projection 52, the pin 61 is caught by the outer projection 51. Then, the outer projection 51 carries the pin 61 up to said position where the pin 61 slips off the outer projection 51 as shown in FIG. 4B. The above behavior of the pin 61 and consequently of the shutter blade 6 is graphically illustrated in FIG. 6 by the line B. As clearly shown by the graphical representation, the shutter blade 6 is put in the closed position only once while the driving gear 5 rotates twice. The broken line Bc shows that the claw 81 is moved downward as the shutter blade 6 is closed and after the shutter is opened the claw 81 is moved upward leaving the film. The film is, therefore, kept still until the shutter is closed again. Thus, a prolonged time exposure is effected. In the embodiment shown in FIGS. 1 to 6, the consequential angle of opening of the shutter blade during prolonged exposure becomes 590° (230° + 360°) for 720° rotation of the driving gear, while the angle during normal exposure is 230° (360° − 130°) for one rotation of the driving gear (460° for 720° rotation).

Figure 6:
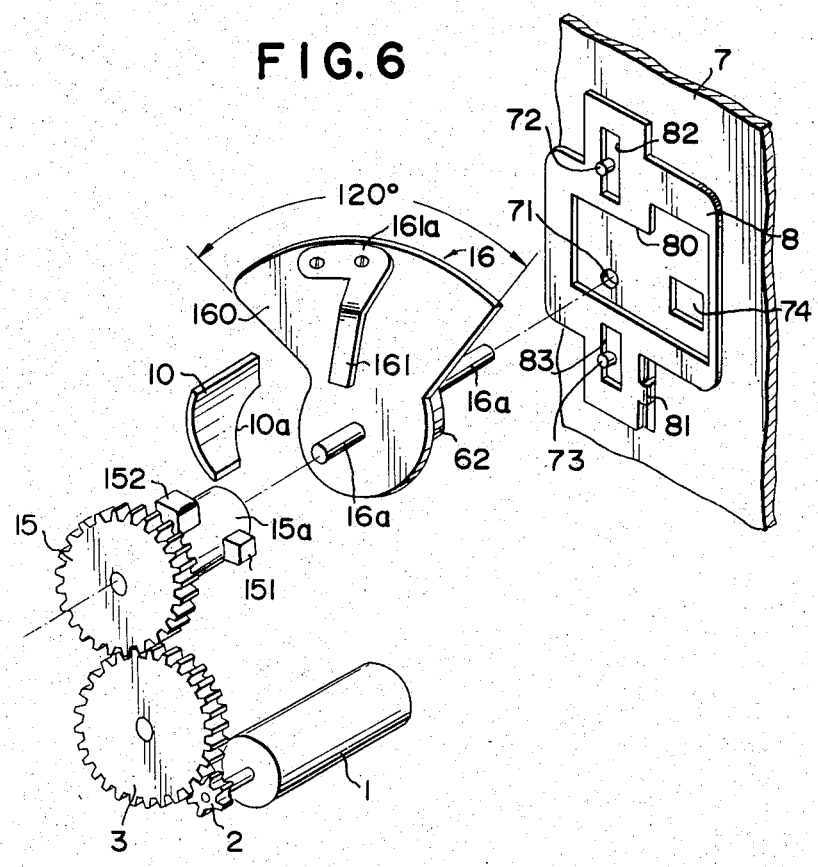
FIG. 6 is an exploded perspective view showing another embodiment of the exposure mechanism in accordance with the present invention.

Now referring to FIGS. 6 and 7 which show another embodiment of the present invention, in which the same elements as those employed in the first embodiment are indicated with the same reference numerals as used in FIGS. 1 to 4, a spring pin 161 made in the form of a leaf spring is fixed to the shutter blade 16 on the driving gear side. One end 161a of the spring pin 161 is secured to the marginal portion of the sector portion 160 of the shutter blade 16 and the other end of the spring pin 161 is left free to resiliently deflect in the direction parallel to the axis of rotation of the shutter blade 16. The shaft 16a of the shutter blade 16 is stationarily supported by hole 71 of the frame 7. A driving gear 15, meshed with an intermediate gear 3 which in turn is driven by a drive gear 2 of a motor 1, has a driving shaft 15a fixed thereto. The driving shaft 15a of the driving gear 15 is provided with two projections 151 and 152 to be brought into engagement with said spring pin 161. The projections 151 and 152 are located out of alignment with each other in both axial and circumferential directions as shown in FIGS. 6 and 7, In the axial direction, as shown in FIGS. 7A to 7E, the outer end 152a of the inner projection 152 and the inner end 151a of the outer projection 151 are substantially aligned with each other. A curved pin guide cam 10 is provided coaxially with the shaft 16a of the shutter blade 16. The pin guide cam 10 has a ramp 10a on the shutter blade side end thereof and is made selectively movable between two positions, in one of which the pin guide cam 10 is not engaged with and does not guide the spring pin 161 and in the other of which the pin guide cam 10 is engaged with the spring pin 161 and the pin 161 is periodically biased axially by the ramp 10a of the pin guide cam 10. The spring pin 161 is elastically held in such a position as to be in engagement with the inner projection 152. The ramp 10a of the pin guide cam 10 is so formed as to bias the pin 161 resiliently held in the normal position to be engaged with the inner projection 152 to the biased position to be engaged with the outer projection 151. The behavior of the pin guide cam 10 and the projections 151 and 152 are shown in FIGS. 7A to 7E in which the periphery of the shaft 15a of the driving gear 15 is shown in development.

Figure 7A:
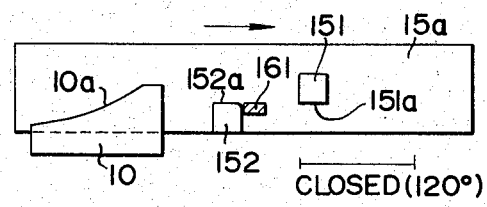
FIGS. 7A to 7E are explanatory developed views showing the behavior of the projections on the driving shaft, a pin on the shutter blade and a pin guide manually operated to control the engagement of the projections and the pin employed in the second embodiment shown in FIG. 7.
Figure 7B:
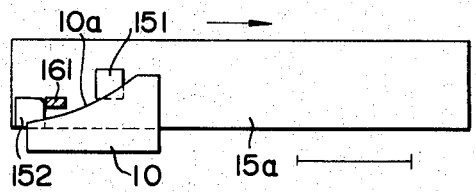
Figure 7C:
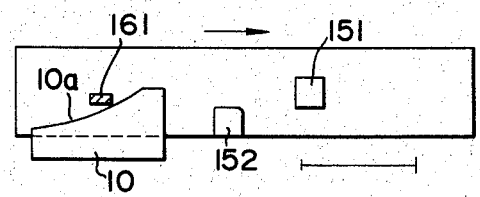
Figure 7D:
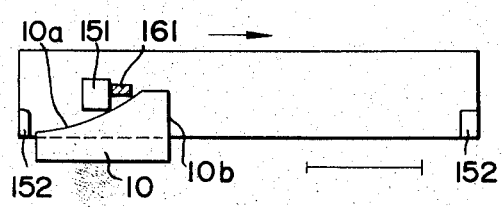
Figure 7E:
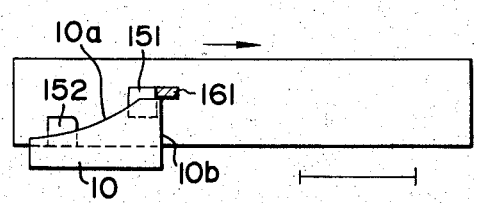

Referring to FIGS. 7A to 7E, the pin guide cam 10 is positioned at the interfering position to axially bias or deflect the pin 161. As the shaft 15a moves rightward in FIG. 7A carrying the projections 151 and 152, the inner projection 152 carries the pin 161 together therewith and makes the pin 161 pass through the close range of 120° as indicated below the shaft 15a. The shutter blade closes the aperture 74 while the pin 161 passes through the close range. Then, when the inner projection 152 comes to the guide cam 10 as shown in FIG. 7B, the pin 161 starts to move along the ramp 10a. As the shaft 15a moves rightward, the pin 161 rises up along the ramp 10a and finally slips off the inner projection 152, and accordingly, the inner projection 152 moves rightward without carrying the pin 161 thereafter as shown in FIG. 7C. While the projections 151 and 152 move rightward, that is while the driving shaft 15a rotates, without carrying the pin 161, the pin 161 stays on the ramp 10a of the pin guide cam 10 at a level beyond the outer end 152a of the inner projection 152. Then, the outer projection 151 comes to the pin 161 on the ramp 10a as shown in FIG. 7D and starts to carry the pin 161 further. When, the outer projection 151 carries the pin 161 up to the top end of the ramp 10a of the cam 10 as shown in FIG. 7E, the pin 161 springs back to the initial level along the tail end edge 10b of the guide cam 10. Immediately thereafter, the inner projection 152 comes to the pin 161 at the lower level and carries the pin 161 further on. Thus, the behavior of the projections 151 and 152 and the pin 161 comes back to the first step as shown in FIG. 7A. In the above steps, while the spring pin 161 stays on the ramp 10a of the pin guide cam 10, the driving shaft 15a runs or rotates almost one revolution of 360°. Since the position on the ramp 10a is not in the close range, the shutter blade 16 is opened during the stay of the pin 161 thereon. Therefore, the exposure time is prolonged by bringing the pin guide cam 10 into the interfering position. If the pin guide cam 10 is retracted from the interfering position, the inner projection 152 is always in engagement with the spring pin 161 and the shutter blade is normally opened and closed. The pin guide cam 10 is manually operated to be put into and retracted from the interfering position. The mechanism for operating the pin guide cam 10 can readily be designed by use of well-known mechanical techniques.

What is claimed is:

1. An exposure time control mechanism for a motion picture camera comprising a rotary shutter blade having a sector portion for closing and opening an aperture of the camera by rotation thereof, a vertically slidable claw plate having a film feed claw and a cam follower portion, a cam means provided on said rotary shutter blade and engaged with said cam follower portion of said claw plate to move said claw plate up and down as the shutter blade rotates, a driving gear driven by a driving source provided in the camera, a transmission means provided in association with said driving gear and said rotary shutter blade for transmitting the rotation of the driving gear to the shutter blade, and a switch means for selectively operating said transmission means to intermittently or continuously transmit the rotation of the driving gear to the shutter blade, said transmission means comprising two projections fixed on said driving gear and a pin fixed on said shutter blade to be engaged with said projections, said switch means comprising a movable switch member which is movable between two positions and operably associated with said transmission means, in one of said positions said pin being continuously engaged with one of said projections and the rotation of the driving gear being continuously transmitted to the shutter blade, and in the other of said positions said pin being alternately engaged with said two projections and the rotation of the driving gear being intermittently transmitted to the shutter blade.

2. An exposure time control mechanism for a motion picture camera as defined in claim 1 wherein said switch member is a swing lever which holds said driving gear to move the driving gear in the direction perpendicular to the axis of rotation thereof and which is movable between two positions in one of which the axis of rotation of the driving gear is in alignment with the axis of rotation of the shutter blade and in the other of which the axis of rotation of the driving gear is out of alignment with the axis of rotation of the shutter blade so that the loci of the projections may be made eccentric with the locus of the pin and the pin may be carried alternately by the two projections whereby, in said latter position, said pin is left in a position to open the shutter after the pin is disengaged from one of said projections until the pin is engaged with the other of said projections during the rotation of the driving gear.

3. An exposure time control mechanism for a motion picture camera as defined in claim 2 wherein the two projections are positioned out of alignment with each other in both radial and circumferential directions.

4. An exposure time control mechanism for a motion picture camera as defined in claim 1 wherein said two projections are fixed to the periphery of a driving shaft secured to the driving gear, said pin is a resilient pin the free end of which is resiliently held in such a position as to be in engagement with one of said projections and is capable of being biased to a position to be engaged with the other of said projections, and said switch member is a pin guide cam which has a ramp to guide said pin to bias the pin into said biased position, said pin guide cam being movable between two positions in one of which the cam is not engaged with said pin and in the other of which the cam is engaged with said pin.

5. An exposure time control mechanism for a motion picture camera as defined in claim 4 wherein said two projections are positioned out of alignment with each other in both axial and circumferential directions and said guide cam extends concentrically with the driving shaft and the ramp of the ram extends from one of said projections to the other.

6. An exposure time control mechanism for a motion picture camera as defined in claim 1 wherein said switch member is manually movable between said two projections.

* * * * *